United States Patent
Vadlamudi et al.

(10) Patent No.: US 11,868,403 B2
(45) Date of Patent: Jan. 9, 2024

(54) METHOD AND SYSTEM FOR FACILITATING REAL-TIME DATA CONSUMPTION BY USING A GRAPH PATH CACHE

(71) Applicant: JPMorgan Chase Bank, N.A., New York, NY (US)

(72) Inventors: Sambasiva R Vadlamudi, Garnet Valley, PA (US); Ramana Nallajarla, Hockessin, DE (US); Rakesh R Pillai, East Brunswick, NJ (US); Satya Sai Sita Rama Rajesh Vegi, Bear, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 133 days.

(21) Appl. No.: 17/645,792

(22) Filed: Dec. 23, 2021

(65) Prior Publication Data

US 2023/0205821 A1 Jun. 29, 2023

(51) Int. Cl.
*G06F 12/0893* (2016.01)
*G06F 16/2455* (2019.01)
*G06F 16/901* (2019.01)
*G06N 20/00* (2019.01)

(52) U.S. Cl.
CPC ...... *G06F 16/9024* (2019.01); *G06F 12/0893* (2013.01); *G06F 16/24552* (2019.01); *G06N 20/00* (2019.01)

(58) Field of Classification Search
CPC ............. G06F 16/9024; G06F 12/0893; G06F 16/24552; G06N 20/00
See application file for complete search history.

(56) References Cited

U.S. PATENT DOCUMENTS

| | | | | |
|---|---|---|---|---|
| 11,281,662 | B2* | 3/2022 | Korpman | G06F 16/8373 |
| 2017/0118273 | A1* | 4/2017 | Hipsh | H04L 67/5681 |
| 2020/0120109 | A1* | 4/2020 | Shu | H04L 63/20 |
| 2021/0004374 | A1* | 1/2021 | Xia | G06F 16/9024 |
| 2021/0073287 | A1* | 3/2021 | Hunter | H04L 9/3239 |
| 2021/0073291 | A1* | 3/2021 | Hunter | H04L 63/123 |
| 2021/0194905 | A1* | 6/2021 | Fong | H04L 63/1425 |
| 2021/0248443 | A1* | 8/2021 | Shu | G06F 16/9024 |
| 2021/0374143 | A1* | 12/2021 | Neill | G06F 16/254 |
| 2023/0076243 | A1* | 3/2023 | Watt | G06N 20/00 |
| 2023/0088676 | A1* | 3/2023 | She | G06F 16/9024 706/25 |
| 2023/0168889 | A1* | 6/2023 | Ghosh | G06Q 10/06311 717/103 |

\* cited by examiner

*Primary Examiner* — Jorge A Casanova
(74) *Attorney, Agent, or Firm* — Greenblum & Bernstein, P.L.C.

(57) ABSTRACT

A method for utilizing a graph path cache to facilitate real-time data consumption by a plurality of machine learning models is disclosed. The method includes receiving an input from a source, the input relating to a request to characterize a data element; retrieving a data attribute that corresponds to the data element from a data management system; determining, in real-time using the graph path cache, a graph attribute that corresponds to the data element by performing deep link analysis on a graph database; executing, in real-time, a model by using the data attribute and the graph attribute, the model corresponding to the request in the input; and transmitting, in real-time, a result of the executed model to the source in response to the input.

17 Claims, 6 Drawing Sheets

METHOD AND SYSTEM FOR FACILITATING REAL-TIME DATA CONSUMPTION BY USING A GRAPH PATH CACHE

BACKGROUND

1. Field of the Disclosure

This technology generally relates to methods and systems for precomputing graph paths, and more particularly to methods and systems for utilizing precomputed graph paths in a graph path cache to facilitate real-time data consumption by machine learning models.

2. Background Information

Many business entities utilize numerous machine learning models to analyze large datasets and provide services such as, for example, synthetic identity fraud detection. Often, large data repositories such as, for example, graph databases are deployed in combination with the machine learning models. Historically, conventional implementation of the graph databases together with the machine learning models have resulted in varying degrees of success with respect to computational requirements to meet service level agreements (SLAs) and horizontal scaling to support real-time data consumption by the machine learning models.

One drawback of using the conventional implementation is that in many instances, to facilitate real-time data consumption by the machine learning models, substantial amounts of computational resources are necessary to meet SLA requirements. As a result, typical computational capabilities are not sufficient to compute features with extremely dense vertices such as, for example, zip codes in a time specified by the SLA requirements. Additionally, horizontal scaling to implement multiple graph databases that support both real-time and batch machine learning models may not be possible due to computational constraints.

Therefore, there is a need to provide a scalable platform that implements graph path caching and unique graph path computing to facilitate real-time data consumption of dense vertices by machine learning models.

SUMMARY

The present disclosure, through one or more of its various aspects, embodiments, and/or specific features or sub-components, provides, inter alia, various systems, servers, devices, methods, media, programs, and platforms for utilizing precomputed graph paths in a graph path cache to facilitate real-time data consumption by machine learning models.

According to an aspect of the present disclosure, a method for utilizing a graph path cache to facilitate real-time data consumption by a plurality of machine learning models is disclosed. The method is implemented by at least one processor. The method may include receiving at least one input from at least one source, the at least one input may relate to a request to characterize at least one data element; retrieving at least one data attribute that corresponds to the at least one data element from at least one data management system; determining, in real-time by using the graph path cache, at least one graph attribute that corresponds to the at least one data element by performing deep link analysis on a graph database; executing, in real-time, at least one model by using the at least one data attribute and the at least one graph attribute, the at least one model may correspond to the request in the at least one input; and transmitting, in real-time, a result of the executed at least one model to the at least one source in response to the at least one input.

In accordance with an exemplary embodiment, the at least one data element may include at least one high-density vertex that connects a plurality of edges, the at least one high-density vertex may correspond to personally identifiable information.

In accordance with an exemplary embodiment, the at least one data attribute may relate to a measurable property of the at least one data element that is determined by the at least one data management system, the at least one data management system may include at least one from among a first-party data management system and a third-party data management system.

In accordance with an exemplary embodiment, the graph path cache may include a precomputation of at least one graph path hop for each of a plurality of high-density vertices, the at least one graph path hop may correspond to a phase in a first sequence of at least one edge that joins a second sequence of distinct vertices.

In accordance with an exemplary embodiment, the graph path cache may include a count attribute for each of the plurality of high-density vertices, the count attribute may represent the corresponding at least one precomputed graph path hop.

In accordance with an exemplary embodiment, the at least one graph path hop may be precomputed for each of the plurality of high-density vertices based on a predetermined schedule.

In accordance with an exemplary embodiment, the method may further include assigning, in real-time, the result of the executed at least one model to at least one batch executor; analyzing, via the at least one batch executor, the result for the at least one model; and retraining, via the at least one batch executor, the at least one model based on the result.

In accordance with an exemplary embodiment, characterizing the at least one data element may include assigning a model score to each of the at least one data element, the model score may facilitate identification of synthetic identity fraud in at least one electronic transaction.

In accordance with an exemplary embodiment, the at least one model may include at least one from among a machine learning model, a statistical model, a mathematical model, a process model, and a data model.

According to an aspect of the present disclosure, a computing device configured to implement an execution of a method for utilizing a graph path cache to facilitate real-time data consumption by a plurality of machine learning models is disclosed. The computing device including a processor; a memory; and a communication interface coupled to each of the processor and the memory, wherein the processor may be configured to receive at least one input from at least one source, the at least one input may relate to a request to characterize at least one data element; retrieve at least one data attribute that corresponds to the at least one data element from at least one data management system; determine, in real-time by using the graph path cache, at least one graph attribute that corresponds to the at least one data element by performing deep link analysis on a graph database; execute, in real-time, at least one model by using the at least one data attribute and the at least one graph attribute, the at least one model may correspond to the request in the at least one input; and transmit, in real-time, a result of the executed at least one model to the at least one source in response to the at least one input.

In accordance with an exemplary embodiment, the at least one data element may include at least one high-density vertex that connects a plurality of edges, the at least one high-density vertex may correspond to personally identifiable information.

In accordance with an exemplary embodiment, the at least one data attribute may relate to a measurable property of the at least one data element that is determined by the at least one data management system, the at least one data management system may include at least one from among a first-party data management system and a third-party data management system.

In accordance with an exemplary embodiment, the graph path cache may include a precomputation of at least one graph path hop for each of a plurality of high-density vertices, the at least one graph path hop may correspond to a phase in a first sequence of at least one edge that joins a second sequence of distinct vertices.

In accordance with an exemplary embodiment, the graph path cache may include a count attribute for each of the plurality of high-density vertices, the count attribute may represent the corresponding at least one precomputed graph path hop.

In accordance with an exemplary embodiment, the processor may be further configured to precompute the at least one graph path hop for each of the plurality of high-density vertices based on a predetermined schedule.

In accordance with an exemplary embodiment, the processor may be further configured to assign, in real-time, the result of the executed at least one model to at least one batch executor; analyze, via the at least one batch executor, the result for the at least one model; and retrain, via the at least one batch executor, the at least one model based on the result.

In accordance with an exemplary embodiment, characterizing the at least one data element may include assigning a model score to each of the at least one data element, the model score may facilitate identification of synthetic identity fraud in at least one electronic transaction.

In accordance with an exemplary embodiment, the at least one model may include at least one from among a machine learning model, a statistical model, a mathematical model, a process model, and a data model.

According to an aspect of the present disclosure, a non-transitory computer readable storage medium storing instructions for utilizing a graph path cache to facilitate real-time data consumption by a plurality of machine learning models is disclosed. The storage medium including executable code which, when executed by a processor, may cause the processor to receive at least one input from at least one source, the at least one input may relate to a request to characterize at least one data element; retrieve at least one data attribute that corresponds to the at least one data element from at least one data management system; determine, in real-time by using the graph path cache, at least one graph attribute that corresponds to the at least one data element by performing deep link analysis on a graph database; execute, in real-time, at least one model by using the at least one data attribute and the at least one graph attribute, the at least one model may correspond to the request in the at least one input; and transmit, in real-time, a result of the executed at least one model to the at least one source in response to the at least one input.

In accordance with an exemplary embodiment, the graph path cache may include a precomputation of at least one graph path hop for each of a plurality of high-density vertices, the at least one graph path hop may correspond to a phase in a first sequence of at least one edge that joins a second sequence of distinct vertices.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
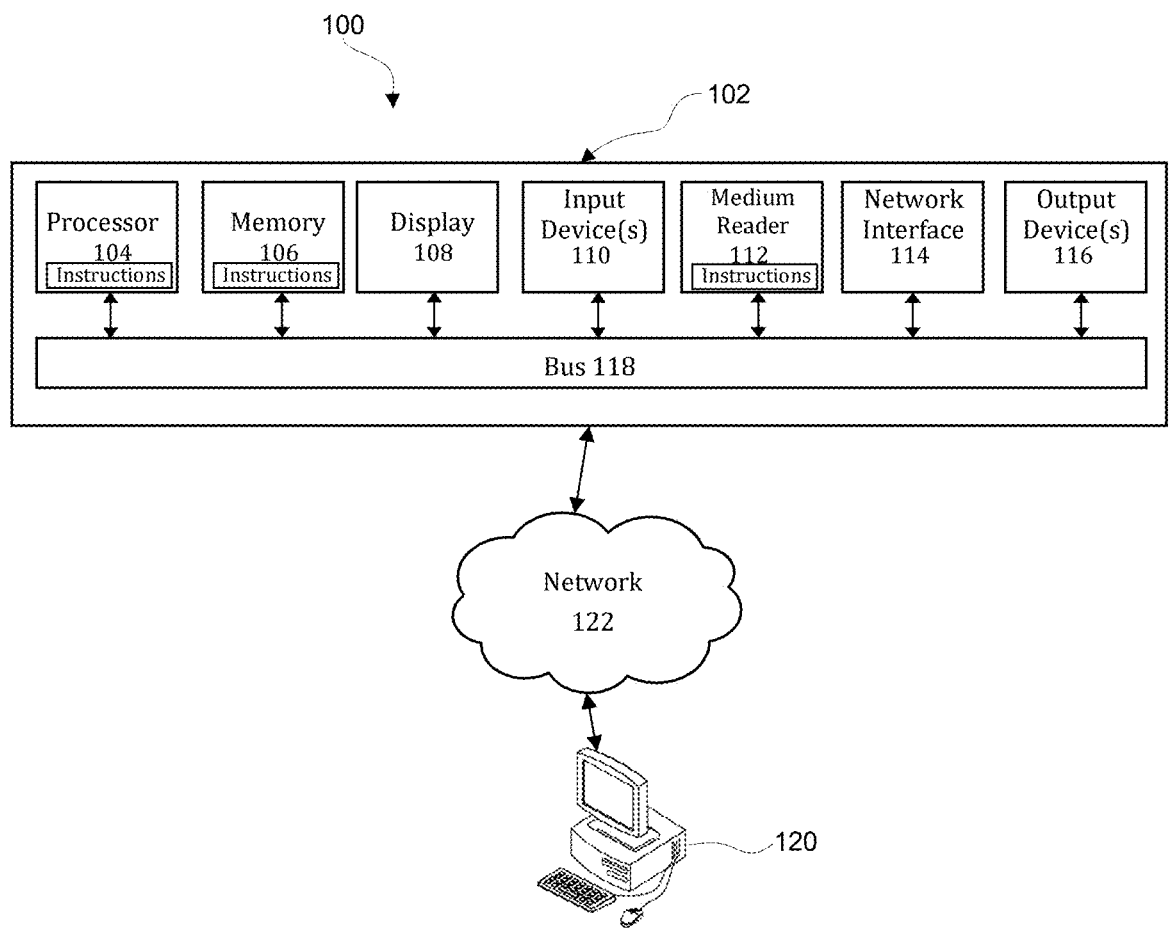
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for utilizing precomputed graph paths in a graph path cache to facilitate real-time data consumption by machine learning models.

Figure 2:
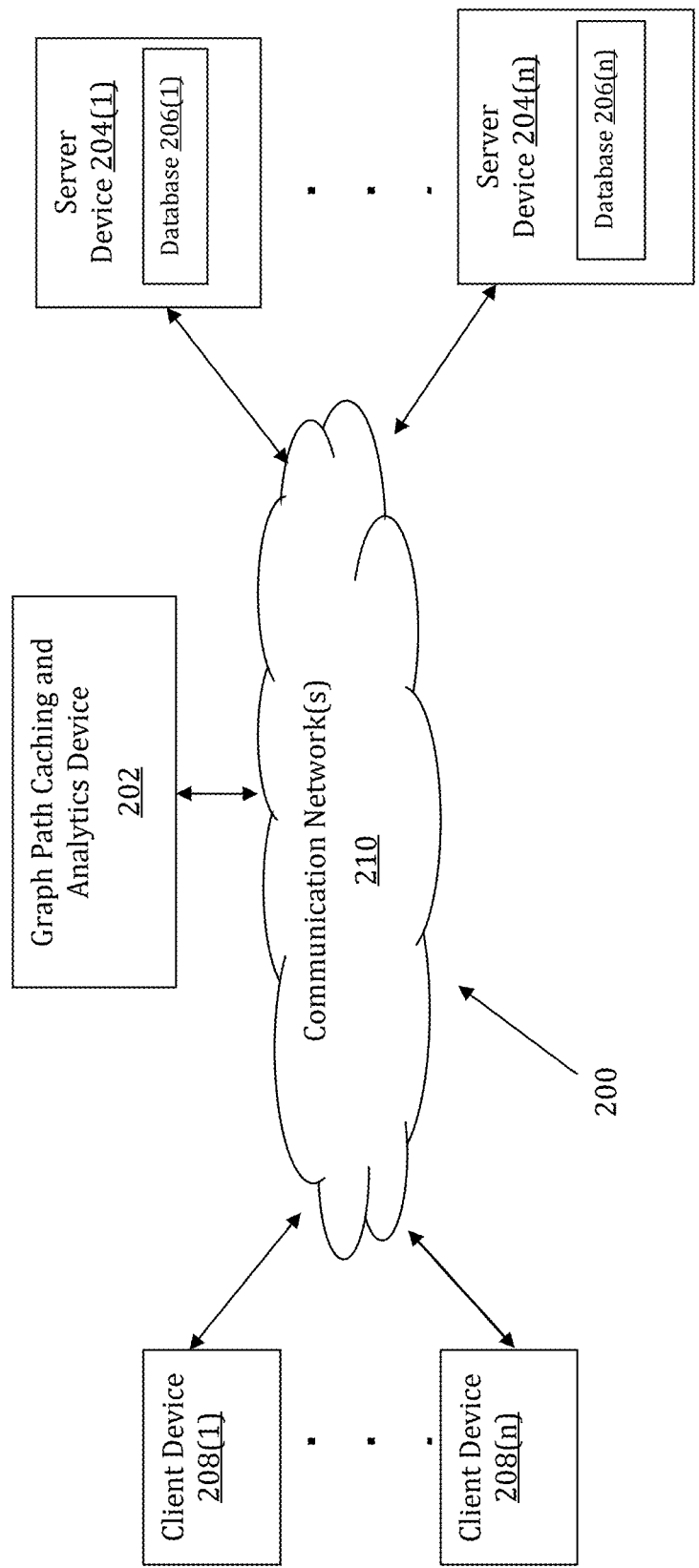
FIG. 2 illustrates an exemplary diagram of a network environment.

Referring to FIG. 2, a schematic of an exemplary network environment 200 for implementing a method for utilizing precomputed graph paths in a graph path cache to facilitate real-time data consumption by machine learning models is illustrated. In an exemplary embodiment, the method is executable on any networked computer platform, such as, for example, a personal computer (PC).

The method for utilizing precomputed graph paths in a graph path cache to facilitate real-time data consumption by machine learning models may be implemented by a Graph Path Caching and Analytics (GPCA) device 202. The GPCA device 202 may be the same or similar to the computer system 102 as described with respect to FIG. 1. The GPCA device 202 may store one or more applications that can include executable instructions that, when executed by the GPCA device 202, cause the GPCA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GPCA device 202 itself, may be located in virtual server(s) running in a cloud-based computing environment rather than being tied to one or more specific physical network computing devices. Also, the application(s) may be running in one or more virtual machines (VMs) executing on the GPCA device 202. Additionally, in one or more embodiments of this technology, virtual machine(s) running on the GPCA device 202 may be managed or supervised by a hypervisor.

In the network environment 200 of FIG. 2, the GPCA device 202 is coupled to a plurality of server devices 204(1)-204(n) that hosts a plurality of databases 206(1)-206(n), and also to a plurality of client devices 208(1)-208(n) via communication network(s) 210. A communication interface of the GPCA device 202, such as the network interface 114 of the computer system 102 of FIG. 1, operatively couples and communicates between the GPCA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GPCA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and GPCA devices that efficiently implement a method for utilizing precomputed graph paths in a graph path cache to facilitate real-time data consumption by machine learning models.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The GPCA device 202 may be a standalone device or integrated with one or more other devices or apparatuses, such as one or more of the server devices 204(1)-204(n), for example. In one particular example, the GPCA device 202 may include or be hosted by one of the server devices 204(1)-204(n), and other arrangements are also possible. Moreover, one or more of the devices of the GPCA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GPCA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to characterization requests, data elements, data attributes, graph attributes, count attributes, graph paths, models, and executed model results.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the GPCA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the GPCA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the GPCA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GPCA device 202, the server devices 204(1)-204(n), or the client devices 208(1)-208(n), for example, may be configured to operate as virtual instances on the same physical machine. In other words, one or more of the GPCA device 202, the server devices 204(1)-204(n), or the client devices 208(1)-208(n) may operate on the same physical device rather than as separate devices communicating through communication network(s) 210. Additionally, there may be more or fewer GPCA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
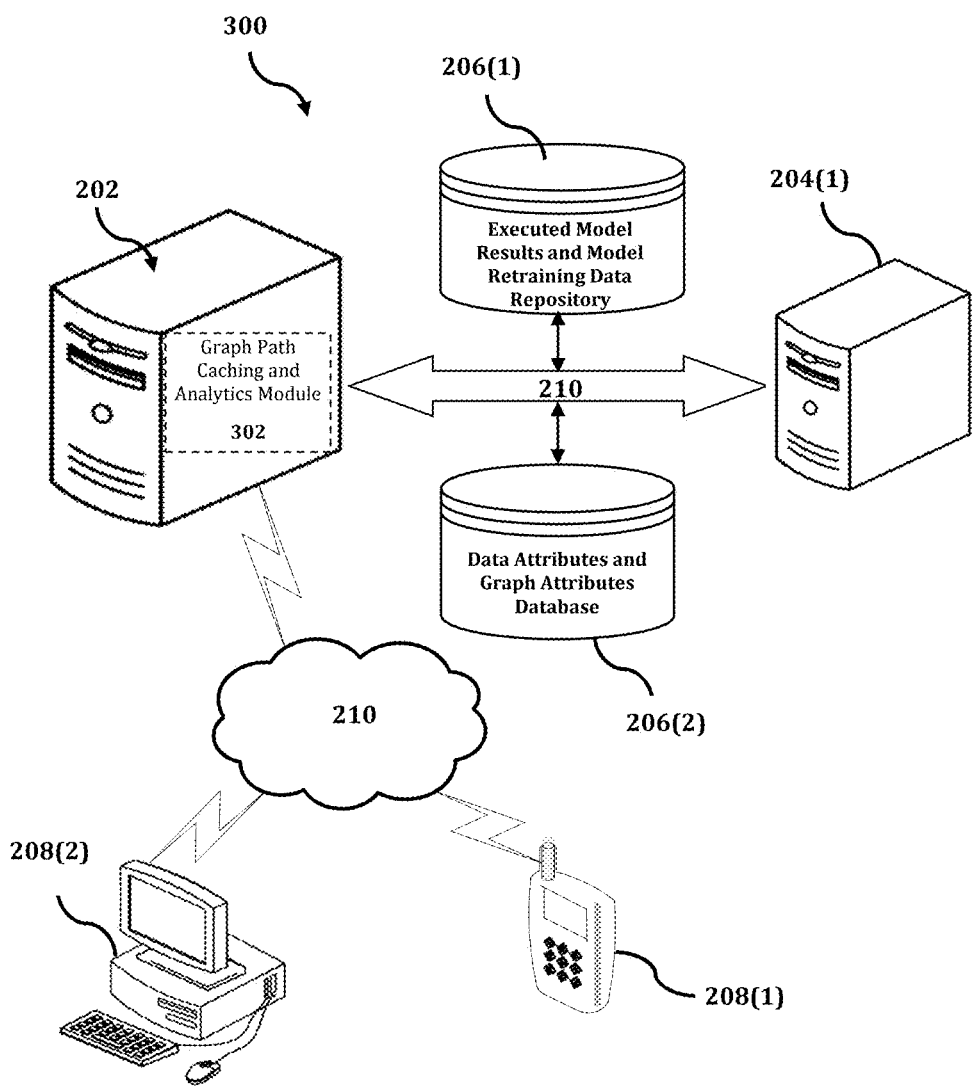
FIG. 3 shows an exemplary system for implementing a method for utilizing precomputed graph paths in a graph path cache to facilitate real-time data consumption by machine learning models.

The GPCA device 202 is described and shown in FIG. 3 as including a graph path caching and analytics module 302, although it may include other rules, policies, modules, databases, or applications, for example. As will be described below, the graph path caching and analytics module 302 is configured to implement a method for utilizing precomputed graph paths in a graph path cache to facilitate real-time data consumption by machine learning models.

An exemplary process 300 for implementing a mechanism for utilizing precomputed graph paths in a graph path cache to facilitate real-time data consumption by machine learning models by utilizing the network environment of FIG. 2 is shown as being executed in FIG. 3. Specifically, a first client device 208(1) and a second client device 208(2) are illustrated as being in communication with GPCA device 202. In this regard, the first client device 208(1) and the second client device 208(2) may be "clients" of the GPCA device 202 and are described herein as such. Nevertheless, it is to be known and understood that the first client device 208(1) and/or the second client device 208(2) need not necessarily be "clients" of the GPCA device 202, or any entity described in association therewith herein. Any additional or alternative relationship may exist between either or both of the first client device 208(1) and the second client device 208(2) and the GPCA device 202, or no relationship may exist.

Further, GPCA device 202 is illustrated as being able to access an executed model results and model retraining data repository 206(1) and a data attributes and graph attributes database 206(2). The graph path caching and analytics module 302 may be configured to access these databases for implementing a method for utilizing precomputed graph paths in a graph path cache to facilitate real-time data consumption by machine learning models.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the GPCA device 202 via broadband or cellular communication. Of course, these embodiments are merely exemplary and are not limiting or exhaustive.

Upon being started, the graph path caching and analytics module 302 executes a process for utilizing precomputed graph paths in a graph path cache to facilitate real-time data consumption by machine learning models. An exemplary process for utilizing precomputed graph paths in a graph path cache to facilitate real-time data consumption by machine learning models is generally indicated at flowchart 400 in FIG. 4.

Figure 4:
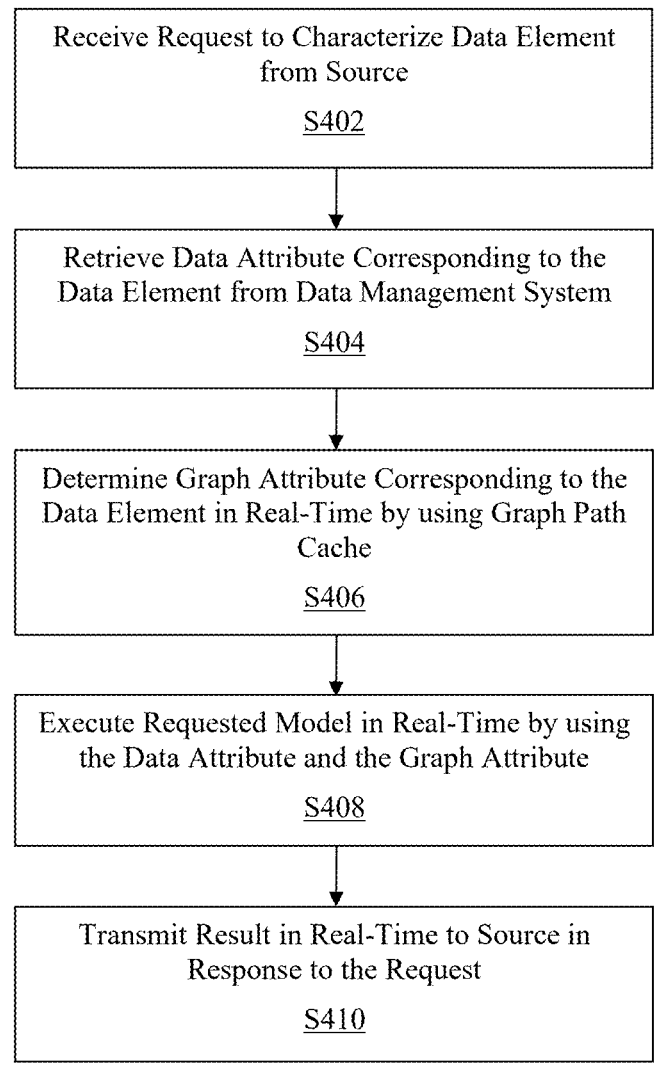
FIG. 4 is a flowchart of an exemplary process for implementing a method for utilizing precomputed graph paths in a graph path cache to facilitate real-time data consumption by machine learning models.

In the process 400 of FIG. 4, at step S402, an input may be received from a source. The input may relate to a request to characterize a data element. In an exemplary embodiment, the source may correspond to a source system that sends real-time requests to the claimed invention consistent with disclosures in the present application. The source may include at least one from among a first-party source system and a third-party source system. In another exemplary embodiment, the request may include a real-time request to characterize the data element by using a machine learning model. The request may include information that relates to at least one from among the characterization desired and the data element. For example, the request may include information that synthetic identity fraud scoring via a machine learning model is desired in real-time for the data element.

In another exemplary embodiment, the data element may include a high-density vertex that connects a plurality of edges. The high-density nature of the vertex may relate to vertices that connect large numbers of edges. The high-density vertex may correspond to personally identifiable information such as, for example, a zip code and an internet protocol (IP) address. In another exemplary embodiment, the data element may be usable to identify features that facilitates machine learning and pattern recognition. The features may correspond to an individual measurable property or characteristic of a phenomenon. In another exemplary embodiment, characterizing the data element may include assigning a model score to the data element. The model score may facilitate real-time identification of synthetic identity fraud in electronic transactions.

At step S404, a data attribute that corresponds to the data element may be retrieved from a data management system. In an exemplary embodiment, the data attribute may relate to a measurable property of the data element that is determined by the data management system. The data attributes may correspond to items of data that are used in machine learning and may be referred to as variables, fields, and/or predictors. For example, the data attributes may correspond to columns in a data set that is used to build, test, and score a machine learning model.

In another exemplary embodiment, the data management system may include at least one from among a first-party data management system and a third-party data management system. The data management system may correspond to a database management system that is designed to handle large amounts of data across many commodity servers such as, for example, APACHE CASSANDRA. In another exemplary embodiment, the claimed invention may initiate a request to a plurality of external vendors for analysis of the data element. For example, the request may be initiated to an external vendor for analysis and data enrichment of a particular piece of personally identifiable information.

At step S406, a graph attribute that corresponds to the data element may be determined by performing deep link analysis on a graph database. The graph attribute may be determined in real-time by using a graph path cache. In an exemplary embodiment, the graph attribute may relate to a measurable property of the data element in graph data. The graph data may correspond to a collection of nodes and relationships between the nodes. The graph data may represent mathematical structures that are used to model pairwise relationships between objects. The mathematical structures may include vertices such as, for example, the nodes, which are connected by edges.

In another exemplary embodiment, the mathematical structures may relate to undirected graphs and directed graphs. In the undirected graphs, edges may link two vertices symmetrically. In directed graphs, the edges may link two vertices asymmetrically. In another exemplary embodiment, the mathematical structures may be persisted in a graph database. The graph database may persist data using graph structures for semantic queries with nodes, edges, and properties to represent and store data. In another exemplary embodiment, the deep link analysis may provide real-time graph analytics that can explore, discover, and predict complex relationships in a graph database. The deep link analysis may utilize graph path hops to traverse across the graph database.

In another exemplary embodiment, the graph attribute may be determined in real-time by using precomputed graph paths in a graph path cache. The graph path cache may include a precomputation of a graph path hop for each of the plurality of high-density vertices. The graph path hop may correspond to a phase in a first sequence of an edge that joins a second sequence of distinct vertices. In another exemplary embodiment, the graph path cache may include a count attribute for each of the plurality of high-density vertices. The count attribute may represent the corresponding precomputed graph path hop.

In another exemplary embodiment, the graph path hop may be precomputed for each of the plurality of high-density vertices based on a predetermined schedule. For example, the graph path hop may be precomputed each day during a period of low computational usage and stored in the graph path cache to facilitate real-time determination of the graph attributes. As will be appreciated by a person of ordinary skill in the art, precomputing the graph path hop, i.e., caching the graph path hop calculations, enables later computation of complex network multi hop queries in less time.

At step S408, a model may be executed in real-time by using the data attribute and the graph attribute. The model may correspond to the request in the input for a desired characterization. For example, a request to score the data element would require execution of a corresponding scoring model. In an exemplary embodiment, the data attribute and the graph attribute may be further processed to accommodate formatting requirements of the model. For example, the data attribute and the graph attribute may be parsed and mapped to facilitate generation of a structured data set that complies with the formatting requirements of the model.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S410, a result of the executed model may be transmitted in real-time to the source in response to the received input. In an exemplary embodiment, the result may include information that relates to the data element and the desired characterization. For example, the result may include a personally identifiable element and a corresponding score in response to a request to score the personally identifiable element. In another exemplary embodiment, the result may be automatically identified and captured from the executed model via a programming interface.

In another exemplary embodiment, the result of the executed model may be assigned in real-time to a batch executor. The batch executor may analyze the result and perform additional analytics based on a predetermined guideline. For example, the batch executor may further analyze the result to generate a report for sending to a user. The batch executor may also retrain the model based on the result. The retraining of the corresponding model may create a feedback loop that further enhances the model. For example, the feedback loop and retraining may further increase scoring accuracy of the scoring model.

Figure 5:
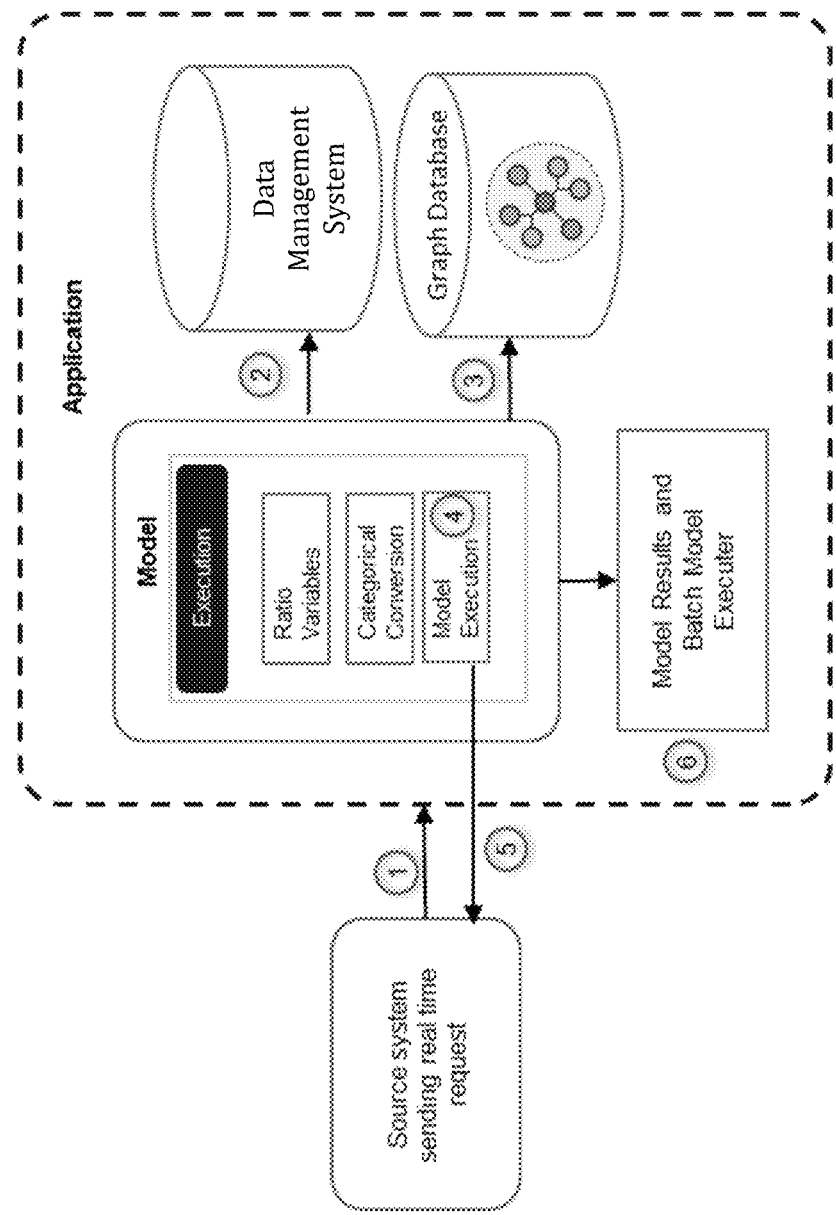
FIG. 5 is an architecture diagram of an exemplary process for implementing a method for utilizing precomputed graph paths in a graph path cache to facilitate real-time data consumption by machine learning models.

FIG. 5 is an architecture diagram 500 of an exemplary process for implementing a method for utilizing precomputed graph paths in a graph path cache to facilitate real-time data consumption by machine learning models. The platform architecture in FIG. 5 represents the claimed invention as an application that may be integrated as part of an application network.

As illustrated in FIG. 5, at step 1, a source system may send an input to the application for model scoring of personally identifiable information (PII) elements. At step 2, the application may send requests to multiple external vendors for analysis of the PII elements. The application may also request data attributes that correspond to the PII elements from a data management system consistent with present disclosures.

At step 3, the application may perform deep link analysis on a graph database to perform all complex executions. The application may utilize a graph path cache consistent with present disclosures to facilitate performance of the complex executions to identify corresponding graph attributes. At step 4, the application may execute the model by using the data attributes and the graph attributes. Then, at step 5, the model results are compiled by the application and sent to the source system in real-time. Additionally, the model results are also sent in real-time from the model to batch executors for model retraining and further analytics.

In another exemplary embodiment, the application may include at least one from among a web application, a monolithic application, and a microservice application. The monolithic application may describe a single-tiered software application where the user interface and data access code are combined into a single program from a single platform. The monolithic application may be self-contained and independent from other computing applications.

In another exemplary embodiment, the web application may correspond to application software that runs on a web server. Unlike computer-based software programs that run locally on the operating system of a device, the web application may be accessed by the user through a web browser with an active network connection. The web application may be programmed by using a client-server modeled structure wherein the user is provided services via an off-site server. The off-site server may include first-party off-site servers as well as third-party off-site servers.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Figure 6:
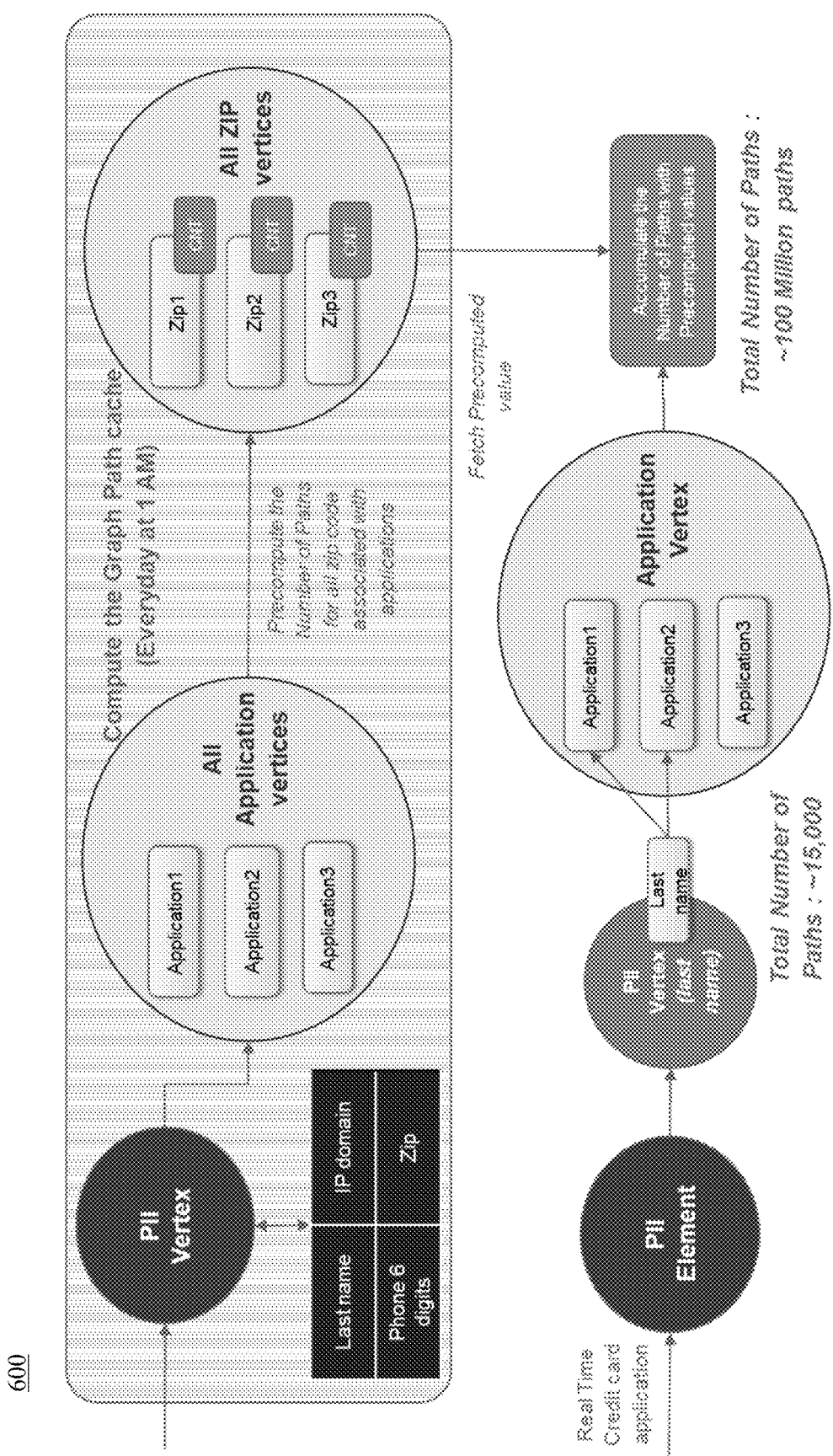
FIG. 6 is a diagram of an exemplary two-hop link variable process for implementing a method for utilizing precomputed graph paths in a graph path cache to facilitate real-time data consumption by machine learning models.

FIG. 6 is a diagram 600 of an exemplary two-hop link variable process for implementing a method for utilizing precomputed graph paths in a graph path cache to facilitate real-time data consumption by machine learning models. In FIG. 6, for each personally identifiable information (PII) element, the application invokes the edge of the associated PII element to identify all applications. Then, the application fetches precomputed values of total paths and accumulate the precomputed values to get total paths.

As illustrated in FIG. 6, the claimed invention may receive PII element data and compute the graph path cache based on a predetermined schedule, i.e., every day at 1:00 A.M. For example, all zip codes may be precomputed to determine a number of paths. Then, when a characterization of the PII element is requested in real-time by a credit card application, the accumulated number of paths with precomputed values may be used to determine the requested characterization efficiently and effectively via a machine learning model.

Accordingly, with this technology, an optimized process for utilizing precomputed graph paths in a graph path cache to facilitate real-time data consumption by machine learning models is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for utilizing a graph path cache to facilitate real-time data consumption by a plurality of machine learning models, the method being implemented by at least one processor, the method comprising:
    receiving, by the at least one processor, at least one input from at least one source, the at least one input relating to a request to characterize at least one data element;
    retrieving, by the at least one processor, at least one data attribute that corresponds to the at least one data element from at least one data management system;
    determining, by the at least one processor in real-time using the graph path cache, at least one graph attribute that corresponds to the at least one data element by performing deep link analysis on a graph database,
        wherein the graph path cache includes a precomputation of at least one graph path hop for each of a plurality of high-density vertices; and
        wherein the at least one graph path hop corresponds to a phase in a first sequence of at least one edge that joins a second sequence of distinct vertices;
    executing, by the at least one processor in real-time, at least one model by using the at least one data attribute and the at least one graph attribute, the at least one model corresponding to the request in the at least one input; and
    transmitting, by the at least one processor in real-time, a result of the executed at least one model to the at least one source in response to the at least one input.

2. The method of claim 1, wherein the at least one data element includes at least one high-density vertex that connects a plurality of edges, the at least one high-density vertex corresponding to personally identifiable information.

3. The method of claim 1, wherein the at least one data attribute relates to a measurable property of the at least one data element that is determined by the at least one data management system, the at least one data management system including at least one from among a first-party data management system and a third-party data management system.

4. The method of claim 1, wherein the graph path cache includes a count attribute for each of the plurality of high-density vertices, the count attribute representing the corresponding at least one precomputed graph path hop.

5. The method of claim 1, wherein the at least one graph path hop is precomputed for each of the plurality of high-density vertices based on a predetermined schedule.

6. The method of claim 1, further comprising:
    assigning, by the at least one processor in real-time, the result of the executed at least one model to at least one batch executor;
    analyzing, by the at least one processor via the at least one batch executor, the result for the at least one model; and
    retraining, by the at least one processor via the at least one batch executor, the at least one model based on the result.

7. The method of claim 1, wherein characterizing the at least one data element includes assigning a model score to each of the at least one data element, the model score facilitating identification of synthetic identity fraud in at least one electronic transaction.

8. The method of claim 1, wherein the at least one model includes at least one from among a machine learning model, a statistical model, a mathematical model, a process model, and a data model.

9. A computing device configured to implement an execution of a method for utilizing a graph path cache to facilitate real-time data consumption by a plurality of machine learning models, the computing device comprising:
    a processor;
    a memory; and
    a communication interface coupled to each of the processor and the memory,
    wherein the processor is configured to:
        receive at least one input from at least one source, the at least one input relating to a request to characterize at least one data element;
        retrieve at least one data attribute that corresponds to the at least one data element from at least one data management system;
        determine, in real-time by using the graph path cache, at least one graph attribute that corresponds to the at least one data element by performing deep link analysis on a graph database,
            wherein the graph path cache includes a precomputation of at least one graph path hop for each of a plurality of high-density vertices; and
            wherein the at least one graph path hop corresponds to a phase in a first sequence of at least one edge that joins a second sequence of distinct vertices;
        execute, in real-time, at least one model by using the at least one data attribute and the at least one graph attribute, the at least one model corresponding to the request in the at least one input; and
        transmit, in real-time, a result of the executed at least one model to the at least one source in response to the at least one input.

10. The computing device of claim 9, wherein the at least one data element includes at least one high-density vertex that connects a plurality of edges, the at least one high-density vertex corresponding to personally identifiable information.

11. The computing device of claim 9, wherein the at least one data attribute relates to a measurable property of the at least one data element that is determined by the at least one data management system, the at least one data management system including at least one from among a first-party data management system and a third-party data management system.

12. The computing device of claim 9, wherein the graph path cache includes a count attribute for each of the plurality of high-density vertices, the count attribute representing the corresponding at least one precomputed graph path hop.

13. The computing device of claim 9, wherein the processor is further configured to precompute the at least one graph path hop for each of the plurality of high-density vertices based on a predetermined schedule.

14. The computing device of claim 9, wherein the processor is further configured to:
assign, in real-time, the result of the executed at least one model to at least one batch executor;
analyze, via the at least one batch executor, the result for the at least one model; and
retrain, via the at least one batch executor, the at least one model based on the result.

15. The computing device of claim 9, wherein characterizing the at least one data element includes assigning a model score to each of the at least one data element, the model score facilitating identification of synthetic identity fraud in at least one electronic transaction.

16. The computing device of claim 9, wherein the at least one model includes at least one from among a machine learning model, a statistical model, a mathematical model, a process model, and a data model.

17. A non-transitory computer readable storage medium storing instructions for utilizing a graph path cache to facilitate real-time data consumption by a plurality of machine learning models, the storage medium comprising executable code which, when executed by a processor, causes the processor to:
receive at least one input from at least one source, the at least one input relating to a request to characterize at least one data element;
retrieve at least one data attribute that corresponds to the at least one data element from at least one data management system;
determine, in real-time by using the graph path cache, at least one graph attribute that corresponds to the at least one data element by performing deep link analysis on a graph database,
wherein the graph path cache includes a precomputation of at least one graph path hop for each of a plurality of high-density vertices; and
wherein the at least one graph path hop corresponds to a phase in a first sequence of at least one edge that joins a second sequence of distinct vertices;
execute, in real-time, at least one model by using the at least one data attribute and the at least one graph attribute, the at least one model corresponding to the request in the at least one input; and
transmit, in real-time, a result of the executed at least one model to the at least one source in response to the at least one input.

* * * * *